United States Patent [19]

Thompson

[11] 4,253,962
[45] Mar. 3, 1981

[54] NON-DESTRUCTIVE VIBRATORY CLEANING SYSTEM FOR REVERSE OSMOSIS AND ULTRA FILTRATION MEMBRANES

[76] Inventor: John R. Thompson, Camarillo, Calif.

[21] Appl. No.: 102,589

[22] Filed: Dec. 12, 1979

[51] Int. Cl.³ .............................................. B01D 31/00
[52] U.S. Cl. .................................. 210/414; 210/433.2
[58] Field of Search .................... 210/19, 23 H, 23 F, 210/433 M, 321 R, DIG. 18, DIG. 22, 414

[56] References Cited

U.S. PATENT DOCUMENTS

| | | | |
|---|---|---|---|
| 2,578,505 | 12/1951 | Carlin | 210/19 X |
| 3,386,583 | 6/1968 | Merten | 210/494 M X |
| 3,491,022 | 1/1970 | Huff | 210/19 |
| 4,158,629 | 6/1979 | Sawyer | 210/414 X |

Primary Examiner—Frank A. Spear, Jr.
Attorney, Agent, or Firm—Richard S. Sciascia; Joseph M. St. Amand

[57] ABSTRACT

Non-destructive vibratory cleaning of reverse osmosis and ultra filtration membranes is accomplished by strategically positioning a plurality of ultrasonic transducers and using a frequency modulating sweep system to vibrate various and different transducers for vibrating liquid adjacent the membrane to be cleaned while preventing long period standing waves from being produced and/or continuously move a transducer along a filter module during cleaning to provide intense ultrasonic energy while preventing formation of membrane destructive standing waves.

12 Claims, 6 Drawing Figures

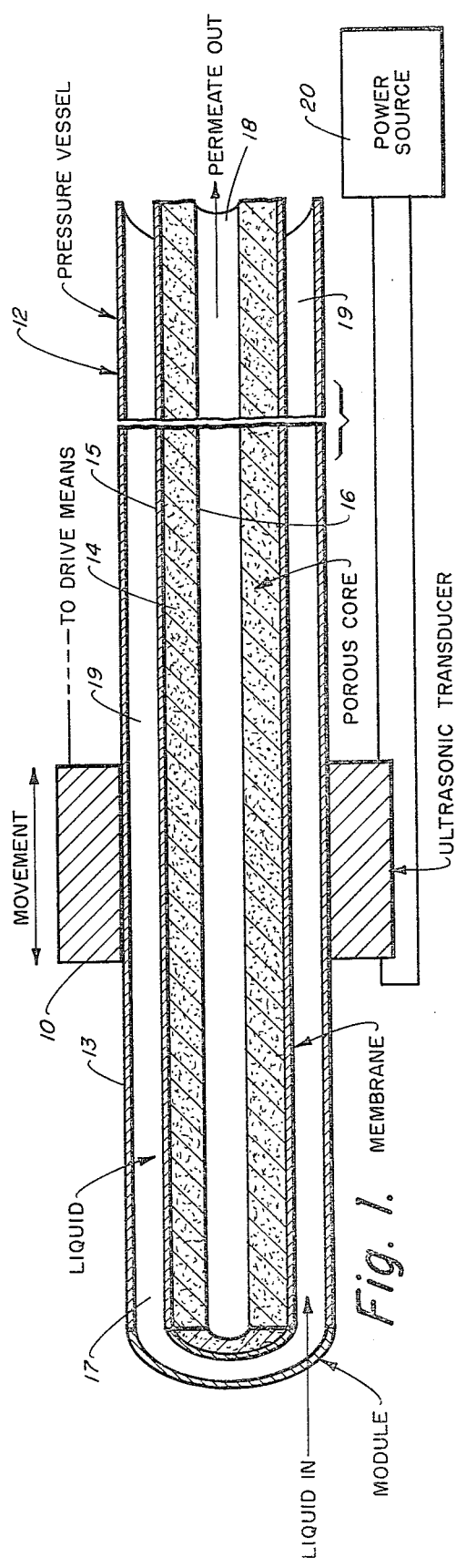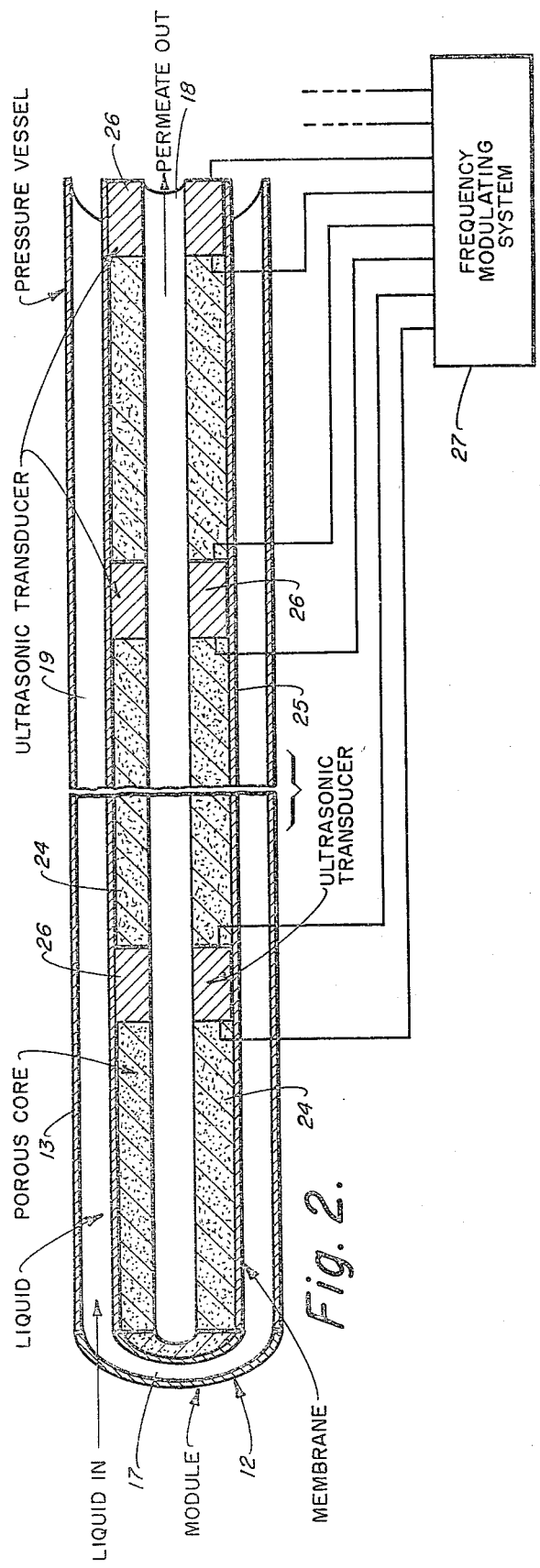

NON-DESTRUCTIVE VIBRATORY CLEANING SYSTEM FOR REVERSE OSMOSIS AND ULTRA FILTRATION MEMBRANES

BACKGROUND OF THE INVENTION

This invention relates to improved means for physically cleaning ion selective membranes, such as reverse osmosis and electrodialysis membranes, without the necessity for using extensive chemical cleaning agents. This is accomplished via ultrasonic vibration of the liquid lying adjacent to the membrane to be cleaned or by vibration, below the threshold of cavitation, transmitted within or adjacent to the membrane. Positioning and/or movement of the ultrasonic transducers prevent standing waves which can otherwise ultimately destroy the membrane. The vibration produced is designed to scour off contaminants on the membrane surface into the bulk feed solution.

The reverse osmosis (RO) process is the most significant water treating process to be discovered within the past 50 years and is gaining more and more uses with commercial industries. Large sums have been spent in research and development efforts with emphasis on developing new membranes with greater water purifying capability. Chemical cleaning of the membranes is the only parameter holding back universal application of the reverse osmosis process. Physical cleaning of such osmosis systems, without destruction of the membranes, has long been needed.

A host of organic and inorganic compounds collect on the surface of ion selective membranes from the passage of contaminated feed streams across the membrane surface. These contaminants block the water permeating surface of the membranes and thereby reduce the produce flux of operations such as reverse osmosis. This product flux reduction is called fouling and this effect must be reduced by periodic cleaning to prolong the membrane's useful life. By reducing the effect of fouling, the economics of water demineralization (or desalination) is greatly enhanced.

Chemical cleaning requires flushing the membrane modules for periods of 10 to 60 minutes. This process also requires purified water (which reduces product water production), skilled personnel to administer chemicals in proper dosages, and a constant chemical supply. This chemical supply takes two forms: cleaning chemicals and pre-treatment chemicals. Pre-treatment includes chemical coagulation, and sedimentation or filtration. Using conservative estimates for coagulation chemicals (2 grains/gal Fe $Cl_3$,3 grains/gal Ca $CO_3$) 6,500 pounds/year are required to treat 25,000 gal/day of water. In addition to the pre-treatment chemical expenditures, 4,000 pounds/year of chemicals are necessary to clean reverse osmosis membranes for 25,000 gal/day water production. This combined chemical expenditure is 10,500 pounds/year and it is this logistic, and operational and maintenance burden which has kept membrane processes from many commercial and other applications.

There is a reverse osmosis system that involves cavitation to facilitate the passage of water through a semipermeable membrane in a reverse osmosis process and uses a combination of high frequency vibrational energy and high pressure to oppose the natural osmotic pressure. However, this system does not provide means to prevent destruction of the membrane from the destructive effects of cavitation and high pressure other than using stronger types of membranes preferably reinforced with glass fibers, or powdered metal to strengthen the membrane and increase its useful life against cavitation destruction.

SUMMARY OF THE INVENTION

The present invention is for a system which accomplishes membrane cleaning without the need for chemical cleaning additives which are currently used today. The present system uses ultrasonic energy in a new and unique way to accomplish membrane cleaning in situ. It should be noted that while ultrasonic energy has been used in the past to assist in the cleaning of membranes, this invention is a new system using configurations which allow in-line, automated use. The present invention uses special positioning or movement of ultrasonic transducers to prevent standing waves which would ultimately destroy the membrane. Vibration of liquid adjacent the membrane scours contaminants from the membrane. In one form, a frequency modulating system is used to prevent long period standing waves from being produced. In another embodiment, movement of the transducer along the filter module provides intense ultrasonic energy throughout the module length while preventing formation of membrane destructive standing waves.

BRIEF DESCRIPTION OF THE DRAWINGS

FIG. 1 illustrates a longitudinal cross-sectional view of an embodiment of the invention wherein a cylindrical ultrasonic transducer slides along the outside of a reverse osmosis module.

FIG. 2 shows a similar module to that illustrated in FIG. 1, but wherein a plurality of transducer sections form portions of the porous ceramic core and a frequency modulating system is used to prevent long period standing waves.

DESCRIPTION AND OPERATION

This invention uses an ultrasonic system which produces vibratory energy to mechanically create trubulence just above the membrane surface or within the membrane itself. The vibratory energy causes contaminants adhering to the membrane to be scoured or vibrated off the membrane surface.

Ultrasonic cleaning is accomplished by cavitating or agitating the liquid lying adjacent to the membrane. Too much energy can destroy the membrane, while too little energy will not be sufficient to remove all contaminants.

The acoustic energy frequency is most important for effective cleaning due to the mathematical relationship of the speed of sound in the media, frequency and wave length, and is shown by the following formulae:

$$\lambda = PS/F$$

where:

λ = wave length
PS = propagation speed in the media
F = frequency

Standing waves (stationary pressurization—rarefaction areas) can be caused by using certain frequencies determined by the complex geometry of the enclosure. An optimum frequency exists for each enclosure. This frequency will do the most work (ft.lbs./unit time) and because of intensity may do the most harm. This optimum frequency is determined empirically for each system.

By using a frequency modulating system (changing frequency linearly or nonlinearly with time) and repeating the frequency sweep systematically, no long period standing waves will be developed. The ultrasonic energy will be dissipated within the swept frequency spectrum.

The frequency sweep (ultrasonic cleaning process) can be activated as necessary to affect membrane cleaning allowing continuous operation of the filter systems.

The methods of introducing ultrasonic energy to the membrane surface are as follows:

A. Propagating ultrasonic waves perpendicular to the axis of the membrane surface from a moveable source such as shown in FIG. 1.

B. Propagating ultrasonic waves from the support structure of the membrane as shown in FIG. 2.

Figure 3:
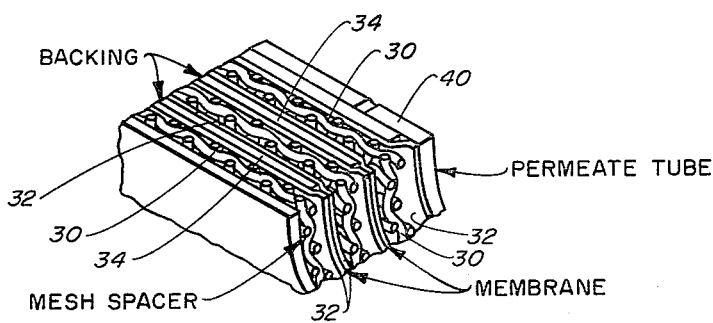
FIG. 3 is an enlarged view of a section of the assembly shown in FIG. 5.
Figure 4:
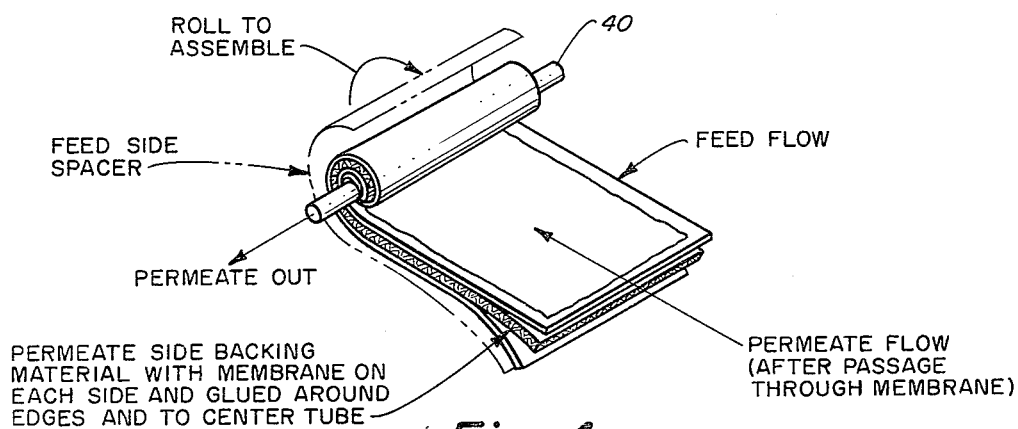
FIG. 4 illustrates the manner in which the module of FIG. 5 is assembled.
Figure 5:
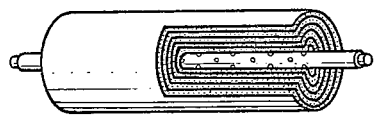
FIG. 5 shows a reverse osmosis module of another embodiment of the invention.

C. Propagating ultrasonic waves from the grid structure lying between membranes and the membranes' support structure as shown in FIGS. 3, 4 and 5.

When referring to the drawings like numerals refer to like parts in each of the figures.

The first method of ultrasonic energy propagation is shown in FIG. 1. Although a tubular configuration is shown, spiral wound and hollow fiber configurations are equally applicable. In this case an ultrasonic cylindrical transducer 10, for example, surrounds a reverse osmosis module 12 (or other container, such as a pipe) and is operable to move laterally along the length of the module. This movement of an exited transducer 10 back and forth along the length of module 12 prohibits the formation of standing waves while providing intense ultrasonic energy throughout the length of the module with the use of only one transducer per module. Any suitable drive means (not shown) can be used to move transducer 10 back and forth along the module length. A plurality of modules can be used in a large system.

The reverse osmosis module 12, for example, comprises a pressure vessel 13 or other container (such as a long pipe section), and a cylindrical porous core 14, for example, positioned therein and having an osmotic membrane 15 surrounding the outer surface of the core, as shown.

If desired, the osmotic membrane can be mounted or bonded adjacent to the inner surface 16 of core 14, or to the outer surface as shown, as may be desired depending upon permeate flow. In the illustration of FIG. 1, permeate enters the module at 17 under pressure, it passes through membrane 15 and porous core 14, and the purified permeate fluid is drawn off from the inside of core 14 at 18. The liquid 19 circulates through module 12 in the area between the vessel wall 13 and membrane 15 while under pressure which exceeds the natural osmotic pressure to cause permeate liquid to flow from 17 to 18. Impurities from liquid 19 remain in or on membrane 15. When vibratory energy from the transducer cylinder 10 scours the contaminants off the membrane they can be flushed out of vessel 13 or allowed to circulate with fluid 19. Transducer 10 is driven by frequency modulated signals from any suitable source 20.

A lubricant is used between the inner wall of transducer cylinder 10 and the outer wall of vessel 13 of the module. The lubricant efficiently couples the acoustic energy emitted by the cylindrical transducer to the module which in turn transfers the energy to the liquid 19 in the module and consequently to membrane 15. The rate of movement of transducer 10 along the module length and the energy level generated together assures effective cleaning of membrane 15 without damaging effects.

The second method of ultrasonic energy propagation is shown in FIG. 2. In this case portions of the ceramic tube 24, upon which a semipermeable membrane 25 is attached, are formed from ultrasonic transducers 26. In this configuration, the transducer portions of the membrane's core backing (ceramic tube) are not used for water treatment but instead operate solely as the vibratory source. For an example, two inches of a ceramic tube can be used as a transducer 26, while the next 12 inches are standard reverse osmosis ceramic tube 24 with bonded membrane 25. The entire length of the ceramic tube is alternate sections of longitudinally vibrating ultrasonic transducers 26 and regular ceramic tube sections 24. These transducers 26 couple the ultrasonic energy efficiently into the standard reverse osmosis portions of the ceramic tube. The ultrasonic projector portions of the tube are driven either by optimum frequency or by a frequency versus time modulated signal from a suitable source 27. Phase relationships between the ultrasonic projector portions are optimally chosen.

In practice, the module can be of any desired length and configuration, FIGS. 1 and 2 merely showing a section along the length. The liquid 19 passing through the system between vessel wall 13 and membrane 15 is under constant pressure, while the permeate draining off at 18 is not under pressure. In a dialysis system, for example, the liquid IN would be a patients blood and permeate OUT would be purified blood.

A third method of ultrasonic energy propagation is shown in FIGS. 3 and 4. Although a spiral wound configuration is shown, an internally or externally pressurized tubular configuration is equally applicable. In the configuration shown here, a grid like mesh structure 30 lies between each of the membrane layers 32 and porous backing material 34. The grid-like mesh structure with membrane and backing is rolled about a ceramic porous core 40, as shown in FIG. 4, and placed in a container to form a module as shown in FIG. 5. The porous core can be like either core shown in FIGS. 1 and 2, and each section of the grid-like mesh structure and membrane can be vibrated by either of the means shown in FIGS. 1 and 2. The module of FIG. 5 can have a movable transducer about the outside as in FIG. 1, or the core 40 can have transducer sections as in FIG. 2. Each section of the grid reacts to the acoustic energy as would a separate diaphram, much in the same manner as a snare drum. The intensity of vibration of each diaphragm is established by the size of the mesh used and the frequency of the acoustic energy. The membrane oscillation is limited by the mechanical configuration of the grid structure 30 and the backing material 34. Proper configuration insures use without the danger of damage to membrane 32. To assure that each cell's resonant frequency is applied, a frequency modulating (changing frequency linearly or non-linearly with time) sweep from the power source is used. This spectrum sweep also precludes the formation of standing waves within the liquid medium 19.

The advantage of using the vibratory energy system disclosed herein to clean the membrane surface is that chemicals are no longer needed, and the problems of membrane destruction due to standing waves as well as problems associated with transporting, storing, handling, metering, and insuring quality of chemicals are eliminated.

Acoustic cleaning of reverse osmosis membranes were attempted in the past. Acoustic transducers were expoxied to the wall of the enclosure containing the reverse osmosis membrane and backing core. The membrane was bonded to the outside of the core (externally pressurized tubular) and purified water was collected within a tube located on the inside of the core. This configuration resulted in rupture of the membrane when cleaning was attempted. These ruptures occurred primarily under the transducers. The ruptures were due to standing waves formed in the liquid and local areas of high cavitation intensity. These ruptures are possible because macroscopic cavitation has been shown to result in temperatures as high as 6,000° F. and negative pressures as great as 10,000 atmospheres within water where gas filled cavities are forced to form and collapse.

The present invention, as disclosed, avoids the problems found in prior uses of acoustic transducers for osmotic membrane cleaning.

Frequencies of between 20 and 40 Kilohertz produces maximum cleaning effectiveness due to the tremendous energy required to form and consequently coallapse the bubbles formed by the pressurization/rarefaction phenomena. The greater the energy released during the collapse phase, the greater the turbulence that will be produced and consequently the greater the cleaning/scouring effect. Higher frequencies (i.e., 100–200 KHz), although not as turbulent producing, form smaller bubbles which can penetrate the pores of many structures inaccessible to larger, more powerful bubble sizes.

Figure 6:
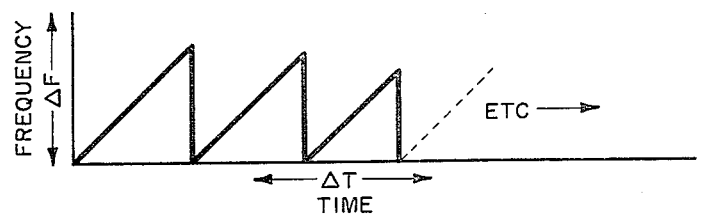
FIG. 6 illustrates a frequency modulating sweep curve (changing frequency linearly or non-linearly with time).

Standing waves can exist within an enclosure such as a reverse osmosis module. There can also exist an optimum frequency for each enclosure which will do the most work. This frequency is determined empirically for each system. In order to alleviate the need to test each enclosure/system to determine the optimum frequency and to alleviate the formation of standing waves, a power source is used having a frequency modulating (changing frequency linearly or non-linearly with time) sweep as illustrated in FIG. 6. This has been found to be most important as shown by membrane degradation experiments at antinodal areas of standing wave patterns. Changing the rarefaction/pressurization geometry pattern via frequency modulating sweep (i.e., 20 KH–200 KH) insures that standing waves and localized cavitation does not occur as a static phenomenon. The sweep also insures that the optimum cleaning frequencies and their harmonics will be encompassed via the use of a broad frequency spectrum.

The configurations shown in FIGS. 1–5 and described herein to propagate the ultrasonic cavitation are unique.

In FIG. 1, the inner wall of cylindrical ultrasonic transducer 10 fits snuggly over the outer wall of the pressure vessel 13. The lubricant used between the two walls insures transmission of the vibratory energy into the pressure vessel by coupling the energy from the transducer surface to the pressure vessel surface. An example of a working lubricant fluid with the aforementioned acoustice and mechanical properties is silicone. The advantages of this configuration are: prohibition of standing waves, insuring efficient cleaning action throughout the length of the module, and using only one transducer per module.

FIG. 2 shows how the core member of the internally or externally pressurized tubular configuration can be the source of the vibratory motion. Piezoelectric materials such as lead zirconate ceramics can be used satisfactorily for transducers 10 or 26.

FIGS. 3–5 show a gridlike structure (mesh spacer) lying between membranes within a spiral wound configuration. Vibratory motion is introduced within the grid net between membranes within a spiral wound configuration. Vibratory motion is introduced within the grid network necessary to cause the cleaning phenomenon. A similar action occurs when the grid lies between the membrane and the core of the tubular configuration. Each section of the grid and membrane reacts to vibratory motion as a separate diaphragm thus providing uniform cleaning throughout the length of the membrane. Vibration below cavitation frequency can be used in this instance. A resonant condition can be established in this configuration by optimizing the geometry of the mesh and the frequency of the ultrasonic energy impinging on it, and therefore cleaning may be accomplished without the aid of cavitation.

The physical cleaning techniques discussed herein are valid not only for ion selective membranes (i.e., reverse osmosis and electrodialysis), but also are applicable to ultrafiltration membranes, microporous membranes and filters, and all surface filtering configurations. Whenever ultrasonic cavitation has been described, vibration below ultrasonic frequencies (i.e., below 20 KH) may be equally effective. In a number of configurations, low frequency vibration is preferred. Also, whenever a particular reverse osmosis module configuration is mentioned (e.g., tubular), it is assumed that other configurations (e.g., spiral wound or hollow fiber) may be used as well.

Obviously many modifications and variations of the present invention are possible in the light of the above teachings. It is therefore to be understood that within the scope of the appended claims the invention may be practiced otherwise than as specifically described.

What is claimed is:

1. A non-destructive vibratory cleaning system for reverse osmosis and ultra filtration membranes, comprising:
    a. a pressure vessel through which liquid to be purified is circulated;
    b. a hollow porous core positioned within and substantially along the length of said pressure vessel;
    c. an osmotic membrane layer surrounding the outer surface of said porous core;
    d. said hollow porous core being of such dimensions that the liquid to be purified can circulate freely between inner walls of said pressure vessel and said osmotic membrane on the outer surface of said core;
    e. means for drawing off purified liquid from within said hollow porous core;
    f. means for providing frequency modulating sweeps of intense vibrational energy, where the frequency changes linearly or non-linearly with time, back and forth along the length of said osmotic membrane, to provide vibration to said osmotic membrane for scouring off contaminants thereon into said circulating liquid to be purified while prohibiting the formation of standing waves of vibrational energy destructive to said osmotic membrane;

g. said means for providing frequency modulating sweeps of intense vibrational energy being adjustable for varying the rate of movement of the sweeps along the length of said osmotic membrane and for varying the intensity of the vibrational energy level to provide frequency change versus time to eliminate destructive standing waves of long duration; said frequency sweep being systemically repeated within the swept frequency spectrum for continuous operation and use of said osmotic membrane during purification of the liquid while assuring the effective cleaning of said osmotic membrane without damage thereto;

h. said means for providing frequency modulating sweeps of vibrational energy comprising an ultrasonic transducer slideably mounted about the exterior of said pressure vessel and which is physically and automatically moved back and forth along the length of said pressure vessel during the cleaning process;

i. said means for providing frequency modulating sweeps of intense vibrational energy being adjustable for varying the rate of movement of said transducer along the length of said pressure vessel and the energy level generated by said moving transducer to assure effective cleaning of said osmotic membrane without damage thereto.

2. A system as in claim 1 wherein said ultrasonic transducer is cylindrical in shape surrounding said pressure and driven back and forth along the length of said pressure vessel during operation of the system.

3. A system as in claim 2 wherein a lubricant is provided between the inner wall of said cylindrical ultrasonic transducer and the outer wall of said pressure vessel; said lubricant efficiently coupling the vibrational energy emitted by said transducer to said pressure vessel which in turn transfers the energy to the liquid and consequently to said osmotic membrane.

4. A system as in claim 3 wherein said lubricant for efficiently transmitting the vibrational energy from said transducer to said pressure vessel is silicone.

5. A system as in claim 1 wherein said osmotic membrane layer is provided with an adjacent grid-like mesh spacer and rolled about said porous core.

6. A system as in claim 5 wherein said osmotic membrane layer and spacer rolled about said porous core forms a plurality of layers of osmotic membrane and spacer between said liquid in and purified liquid drawn out of said porous core.

7. A system as in claim 5 wherein said osmotic membrane layer comprises two layers of osmotic membrane having a permeable backing material sandwiched therebetween.

8. A system as in claim 5 wherein said vibrational energy causes said grid and membrane to react as a separate diaphragm providing uniform cleaning throughout the length of said membrane.

9. A system as in claim 1 wherein said vibrational energy ranges from below ultrasonic to ultrasonic frequencies, and cleaning of said membrane is accomplished without the aid of destructive cavitation.

10. A system as in claim 1 wherein a drive means is provided for continuously moving said movable ultrasonic transducer back and forth along the length of said pressure vessel.

11. A non-destructive vibratory cleaning system for reverse osmosis and ultra filtration membranes, comprising:

a. a pressure vessel through which liquid to be purified is circulated;

b. a hollow porous core positioned within and substantially along the length of said pressure vessel;

c. an osmotic membrane layer surrounding the outer surface of said porous core;

d. said hollow porous core being of such dimensions that the liquid to be purified can circulate freely between inner walls of said pressure vessel and said osmotic membrane on the outer surface of said core;

e. means for drawing off purified liquid from within said hollow porous core;

f. means for providing frequency modulating sweeps of intense vibrational energy, where the frequency changes linearly or non-linearly with time, back and forth along the length of said osmotic membrane, to provide vibration to said osmotic membrane for scouring off contaminants thereon into said circulating liquid to be purified while prohibiting the formation of standing waves of vibrational energy destructive to said osmotic membrane;

g. said means for providing frequency modulating sweeps of intense vibrational energy being adjustable for varying the rate of movement of the sweeps along the length of said osmotic membrane and for varying the intensity of the vibrational energy level to provide frequency change versus time to eliminate destructive standing waves to long duration; said frequency sweep being systematically repeated within the swept frequency spectrum for continuous operation and use of said osmotic membrane during purification of the liquid while assuring the effective cleaning of said osmotic membrane without damage thereto;

h. said means for providing frequency modulating sweeps of intense vibrational energy comprising a plurality of longitudinally vibrating ultrasonic tubular transducer sections alternately spaced along the length of said hollow porous core and which form various tubular portions thereof and a frequency modulator system for driving various ones of said tubular transducer sections at different times and at various intensities to produce a spectrum sweep of vibrational energy longitudinally back and forth along the length of said hollow porous core and osmotic membrane wherein said vibrational energy ranges from below ultrasonic to ultrasonic frequencies, and cleaning of said membrane is accomplished without the aid of destructive cavitation.

12. A system as in claim 11 wherein said transducer sections of said porous core and made from lead zirconate ceramics.

* * * * *